(12) United States Patent
Bartosch (10) Patent No.: US 11,578,791 B1
(45) Date of Patent: Feb. 14, 2023

(54) FLANGED CAM FOLLOWER (71) Applicant: Intech Powercore Corporation, Closter, NJ (US)

(72) Inventor: Georg Bartosch, Demarest, NJ (US)

(73) Assignee: Intech Powercore Corporation, Closter, NJ (US)

( * ) Notice: Subject to any disclaimer, the term of this patent is extended or adjusted under 35 U.S.C. 154(b) by 0 days.

(21) Appl. No.: 17/843,080

(22) Filed: Jun. 17, 2022

(51) Int. Cl.
F16H 53/06 (2006.01)
F16H 53/08 (2006.01)
F16H 53/00 (2006.01)

(52) U.S. Cl.
CPC ............. F16H 53/06 (2013.01); F16H 53/00 (2013.01); F16H 53/08 (2013.01); Y10T 74/2107 (2015.01)

(58) Field of Classification Search
CPC .......... F16H 53/06; F16H 53/00; F16H 53/08; Y10T 74/2107; Y10T 74/2101
USPC .......................................................... 74/569
See application file for complete search history.

(56) References Cited

U.S. PATENT DOCUMENTS

| | | | |
|---|---|---|---|
| 1,782,622 A | 11/1930 | Kilian | |
| 2,265,554 A * | 12/1941 | Thomas | F16H 53/06 74/569 |
| 3,467,450 A | 9/1969 | Schmidt | |
| 4,078,642 A | 3/1978 | Payne | |
| 5,286,115 A | 2/1994 | Toji et al. | |
| 5,724,861 A | 3/1998 | Mang | |
| 5,806,653 A | 9/1998 | Ahls et al. | |
| 5,885,006 A * | 3/1999 | Sheedy | F16C 17/02 384/275 |
| 6,086,757 A * | 7/2000 | Wilcher | B01D 29/445 74/DIG. 10 |
| 6,164,109 A | 12/2000 | Bartosch | |
| 6,280,097 B1 * | 8/2001 | Mues | F16C 33/62 384/449 |

(Continued)

FOREIGN PATENT DOCUMENTS

| | | | |
|---|---|---|---|
| DE | 4216900 A1 * | 11/1992 | .............. F16C 29/04 |
| GB | 1008522 | 10/1965 | |

(Continued)

OTHER PUBLICATIONS

Mues, K, "Getting the Right Cam-Follower Bearing", Machine Design, Feb. 12, 20, Available at https://www.machinedesign.com/mechanical-motion-systems/article/21122869/getting-the-right-camfollower-bearing.

*Primary Examiner* — Vinh Luong (74) *Attorney, Agent, or Firm* — Forge IP, PLLC (57) ABSTRACT A cam follower includes a shaft and a hub rotatable with respect to the shaft via at least one bearing. A flanged tire is affixed to the outer peripheral surface of the hub, the flanged tire having a main body portion and a flange portion extending radially outwardly therefrom. The main body portion and the flange portion are integrally formed from a polymeric material, and the hub, the main body portion and the flange portion are disposed so as to define a generally planar outer surface. A flange support plate, having a support plate outer diameter that is generally equal to or greater than the flange diameter, is positioned abutting the generally planar outer surface and is rigidly affixed to the hub, the flange support plate being formed from a metal material, thereby providing structural support to the flange portion for axial forces applied to the flange portion.

26 Claims, 5 Drawing Sheets (56) References Cited

U.S. PATENT DOCUMENTS

| | | |
|---|---|---|
| 6,393,938 B1 | 5/2002 | Sahara et al. |
| 10,801,546 B2 | 10/2020 | Pallini et al. |
| 2007/0063626 A1 | 3/2007 | Scott |
| 2008/0011119 A1 | 1/2008 | Bartosch |

FOREIGN PATENT DOCUMENTS

| | | |
|---|---|---|
| JP | 2004257498 | 9/2004 |
| WO | WO2021133278 | 7/2021 |

\* cited by examiner

FLANGED CAM FOLLOWER

FIELD OF THE INVENTION

The present invention relates generally to a cam follower, and more particularly to a flanged cam follower adapted to bear loads both in generally radial, as well as generally axial, directions.

BACKGROUND OF THE INVENTION

Flanged cam followers are used for a variety of purposes, such as to enable linear motion of an object on a rail. They are generally used in pairs for such applications, each mounted on the opposing side of the object, with the flanges running on the side of the rail, preventing the object from sliding off the rail. The flanges are designed to carry any side load (i.e., generally axial to the cam followers) that might develop when the object is moving.

Traditional flanged cam followers are made of metal in order to provide the structural integrity needed to withstand repeated and potentially substantial axial loads. Attempts to create polymer flanged cam followers have generally resulted in the flanges being prone to being sheared off when significant axial loads are applied thereto, particularly when those loads are repeated over time.

Metal flanged cam followers, however, suffer from various disadvantages of their own. Metal flanged cam followers are subject to wear as a result of repeated contact with a rail. A conventional camming arrangement includes a metal rail and one or more mating pairs of metal flanged cam followers, each having one or more contact surfaces. As the flanged cam followers contact the rail, the metal of the cam followers, as well as the metal of the rail, become worn and both the flanged cam followers and the rail need to be replaced. The replacement of the rail and the flanged cam followers requires a prolonged down time, and consequently involves significant direct and indirect costs.

In addition, metal rails and metal flanged cam followers require lubrication, such as grease, oil, or other lubricating substances (i.e., lubrication on the rail to prolong its life and internal lubrication of the cam follower). In clean applications (e.g., food processing, pharmaceutical processing, etc.), this lubrication can damage, corrupt and/or contaminate the material being processed (e.g., food, medicine, packaging, etc.) or other components or machines in the process. Thus, the maintenance, replacement and repair of metal flanged cam followers requires a substantial amount of time because the lubrication material needs to be properly applied, and even then, this does not completely solve the problem of excess lubrication causing problems with the process.

Over-greasing of the metal flanged cam follower is also a common occurrence. When the inside of the cam follower is packed with too much grease, the cam follower has a very high resistance to rolling and tends to slide on the metal surface of the rail. This causes excessive rail wear as well as the development of a flat surface on the flanged cam follower. Metal cam followers that develop a flat surface will not turn and have to be replaced.

In addition, over time, the lubrication decreases and a contact surface of the rail begins to rub directly against a contact surface of the metal flanged cam follower. This may result in noise (e.g., squeaking), decreased performance (e.g., slower operating speed, higher operating temperature), or even complete failure. Moreover, even if the failure is not catastrophic, metal particles may be formed, thereby leading to the potential for particulate contamination.

Furthermore, as is well known, metals are, in general, excellent electrical conductors. While this may, of course, be desirable in some circumstances, in the context of rails and their associated flanged cam followers, a high degree of electrical insulation is often preferred instead. Thus, provision of a polymer cam follower, which are generally excellent electrical insulators, would be advantageous.

The present invention, therefore, aims to provide a flanged polymeric cam follower, with its attendant benefits (e.g., reduced or no requirement for lubrication on the rail or the bearings, reduced or no rail wear, reduced noise, excellent electrical insulation), while at the same time ensuring the structural integrity needed to withstand repeated and potentially substantial axial loads, particularly on the flange portion of the cam follower.

SUMMARY OF THE INVENTION

In accordance with one aspect of the present invention, a cam follower includes a shaft extending from a first axial shaft end to a second axial shaft end and a hub defining an interior area with at least one bearing disposed therein, the at least one bearing being disposed over the first axial shaft end such that the hub is rotatable with respect to the shaft via the at least one bearing, the hub further defining an outer peripheral surface. A flanged tire is affixed to the outer peripheral surface of the hub and is rotatable with the hub with respect to the shaft, the flanged tire having a main body portion with a generally cylindrical outer surface with a main body diameter and having a flange portion extending radially outwardly from the generally cylindrical outer surface of the main body portion, the flange portion having a flange diameter that is larger than the main body diameter. The main body portion and the flange portion are integrally formed from a polymeric material, and the hub, the main body portion and the flange portion are disposed so as to define a generally planar outer surface facing the second axial shaft end. A flange support plate, having a support plate outer diameter that is generally equal to or greater than the flange diameter, is positioned abutting the generally planar outer surface and is rigidly affixed to the hub, the flange support plate being formed from a metal material, thereby providing structural support to the flange portion for forces applied to the flange portion in a direction normal to the generally planar outer surface.

In some embodiments, the outer peripheral surface of the hub is generally cylindrical. In certain of these embodiments, the outer peripheral surface of the hub has protrusions, recesses or both protrusions and recesses thereon in order to enhance attachment of the flanged tire to the hub. In certain of these embodiments, the outer peripheral surface of the hub is knurled in order to enhance attachment of the flanged tire to the hub.

In some embodiments, the hub is formed from a metal material. In certain of these embodiments, the hub is formed from stainless steel. In certain of these embodiments, the flange support plate is formed from stainless steel.

In some embodiments, the at least one bearing comprises at least two bearings. In certain of these embodiments, the at least one bearing comprises at least three bearings.

In some embodiments, the second axial shaft end comprises a fastener adapted to attach the shaft to another component. In certain of these embodiments, the fastener of the second axial shaft end comprises a threaded portion.

In some embodiments, the main body portion and the flange portion of the flanged tire are monolithic. In certain of these embodiments, the main body portion and the flange portion of the flanged tire are formed from a polyamide material.

In some embodiments, a plurality of fasteners are provided for rigidly affixing the flange support plate to the hub. In certain of these embodiments, the fasteners are screws passing through holes in the flange support plate and engaging threaded openings in the hub.

In some embodiments, the flange support plate includes an opening passing therethrough having an inner support plate diameter, wherein the opening passing through the flange support plate is sized and positioned to accommodate the shaft. In certain of these embodiments, the interior area of the hub has an inner hub diameter and the inner support plate diameter is smaller than the inner hub diameter, whereby the at least one bearing is retained in the interior area of the hub by the flange support plate.

In accordance with another aspect of the present invention, a cam follower includes a shaft extending from a first axial shaft end to a second axial shaft end, the second axial shaft end comprising a fastener adapted to attach the shaft to another component, and a hub defining an interior area with at least one bearing disposed therein, the at least one bearing being disposed over the first axial shaft end such that the hub is rotatable with respect to the shaft via the at least one bearing, the hub being formed from a metal material and further defining a generally cylindrical outer peripheral surface having protrusions, recesses or both protrusions and recesses formed thereon. A flanged tire is affixed to the outer peripheral surface of the hub and is rotatable with the hub with respect to the shaft, the flanged tire having a main body portion with a generally cylindrical outer surface with a main body diameter and having a flange portion extending radially outwardly from the generally cylindrical outer surface of the main body portion, the flange portion having a flange diameter that is larger than the main body diameter. The main body portion and the flange portion are integrally formed from a monolithic piece of polymeric material, and the hub, the main body portion and the flange portion are disposed so as to define a generally planar outer surface facing the second axial shaft end. A flange support plate having a support plate outer diameter that is generally equal to or greater than the flange diameter, abuts the generally planar outer surface and is rigidly affixed to the hub by a plurality of threaded fasteners passing through holes in the flange support plate and engaging threaded openings in the hub. The flange support plate includes an opening passing therethrough having an inner support plate diameter, the opening passing through the flange support plate being sized and positioned to accommodate the shaft. The flange support plate is formed from a metal material, thereby providing structural support to the flange portion for forces applied to the flange portion in a direction normal to the generally planar outer surface.

In some embodiments, the outer peripheral surface of the hub is knurled in order to enhance attachment of the flanged tire to the hub. In some embodiments, the hub is formed from stainless steel. In certain of these embodiments, the flange support plate is formed from stainless steel.

In some embodiments, the at least one bearing comprises at least two bearings. In certain of these embodiments, the at least one bearing comprises at least three bearings.

In some embodiments, the fastener of the second axial shaft end comprises a threaded portion. In some embodiments, the main body portion and the flange portion of the flanged tire are formed from a polyamide material. In some embodiments, the interior area of the hub has an inner hub diameter and the inner support plate diameter is smaller than the inner hub diameter, whereby the at least one bearing is retained in the interior area of the hub by the flange support plate.

Other features and advantages of the invention will become more apparent from consideration of the following drawings.

DETAILED DESCRIPTION OF THE INVENTION

The present invention may be further understood with reference to the following description and the appended drawings, wherein like elements are referred to with the same reference numerals. Exemplary embodiments of the present invention describe flanged cam followers in rail applications, i.e., where the cam follower is contacting a rail system, such as in a conveyor system. It should be understood, however, that the present invention may be implemented in any camming arrangement that utilizes a flanged cam follower. Indeed, the flanged cam follower of the present invention is suitable for any application where a flanged cam follower is used, subject to the environmental capabilities of the materials being used.

As shown in FIGS. 1-4, the flanged cam follower (10) of the present invention generally includes a shaft (12), a hub (14) rotatable about the shaft (12) via three ball bearings (16, 18, 20), a flanged tire affixed to the hub (14) and rotatable with the hub (14) about the shaft (12), and a flange support plate (22) rigidly affixed to the hub (14). Each of these elements, along with their configuration and operation, will be described in more detail below.

Figure 4:
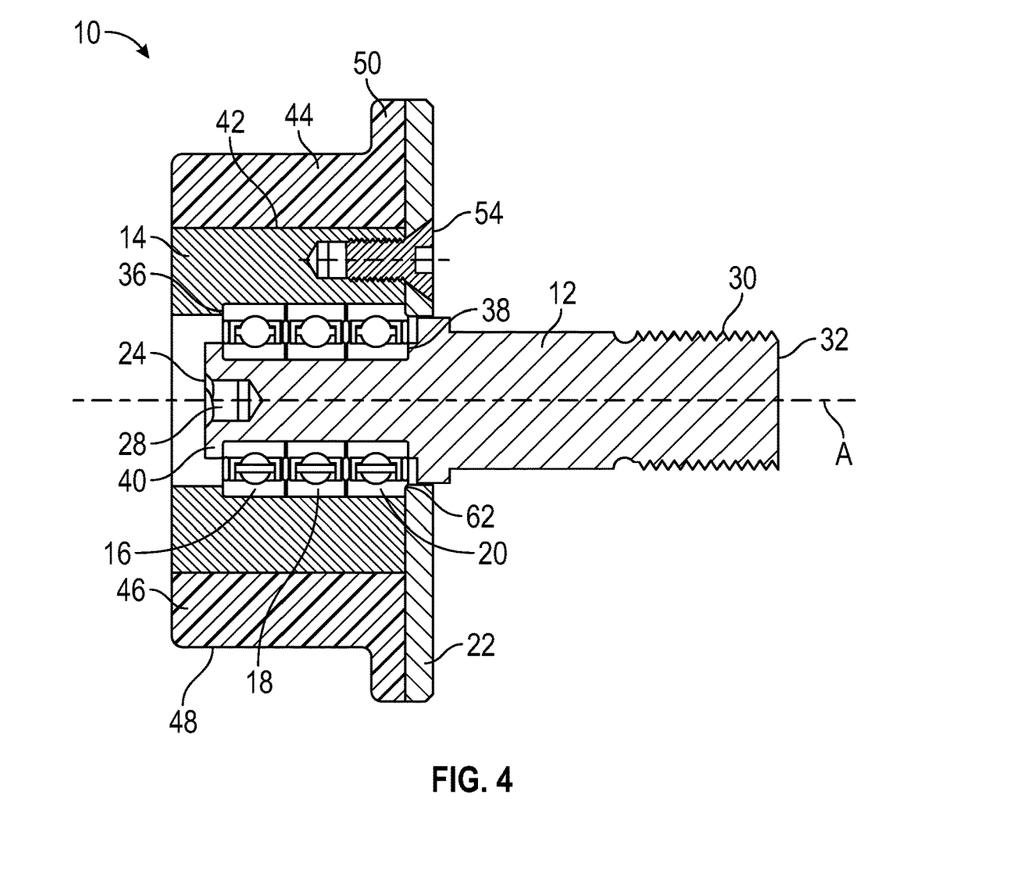
FIG. 4 is a side partially cross-sectional view of the flanged polymeric cam follower of FIGS. 1-3, taken along line 4-4 of FIG. 3.
Figure 5A:
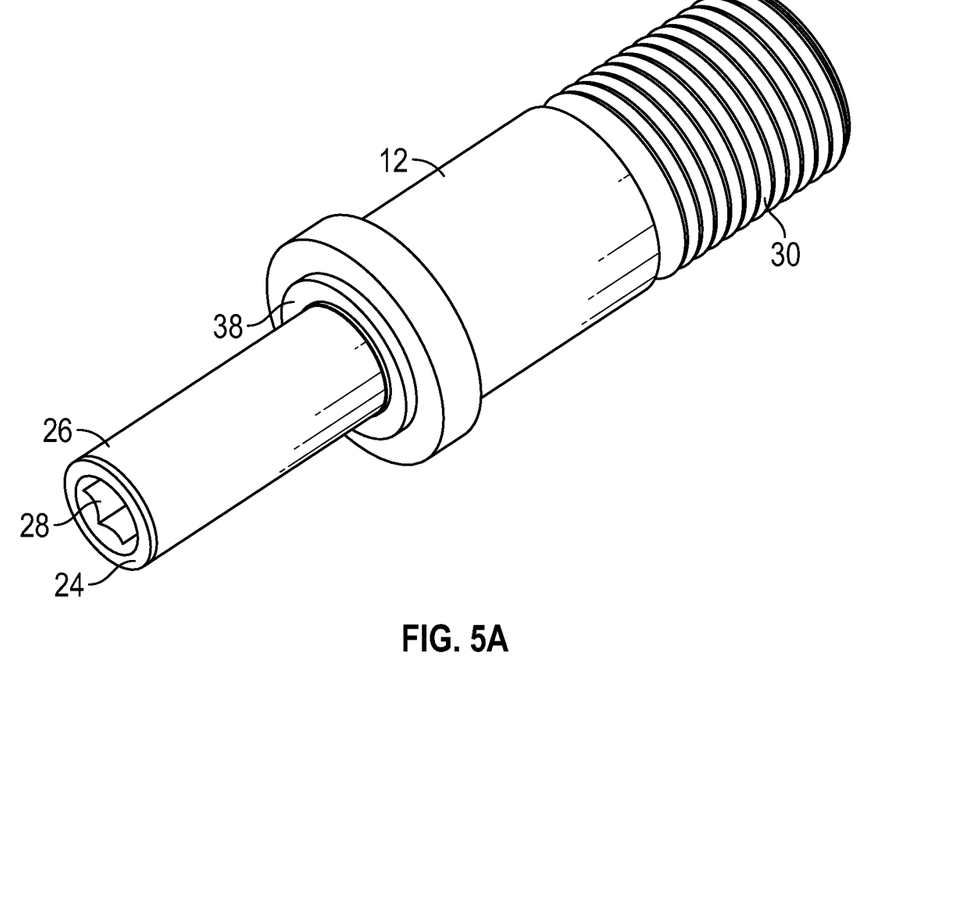
FIGS. 5A and 5B are, respectively, side isometric and side elevational views of a shaft portion of the flanged polymeric cam follower of FIGS. 1-4.
Figure 5B:
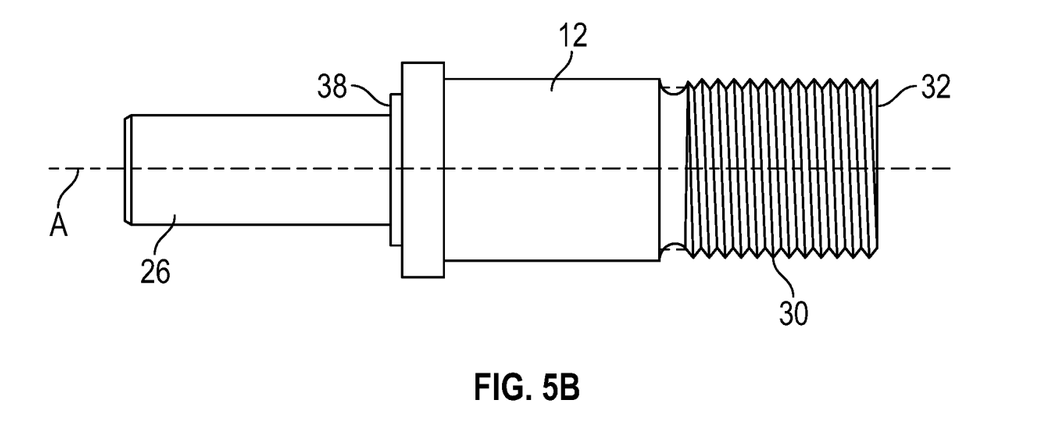

As best seen in FIGS. 4, 5A and 5B, the shaft (12) includes a face (24) at the first axial end (26) thereof perpendicular to an axis of rotation (A) of the flanged cam follower (10). The face (24) has a recessed hexagonal socket (28) configured to receive a hex wrench, or the like, for rotating the shaft (12) about the axis of rotation (A). The shaft (12) further includes a plurality of threads (30) on a radial outside surface of the shaft (12) at the second axial end (32) thereof. In this way, the shaft (12) can be received in a bore (not shown) comprising a complementary thread pattern or can similarly be received in a nut or the like having a complementary thread pattern. If desired, the shaft (12) may optionally also include a hollow portion (not shown) to allow for weight reduction of the shaft (12) for efficiency of operation.

Figure 6A:
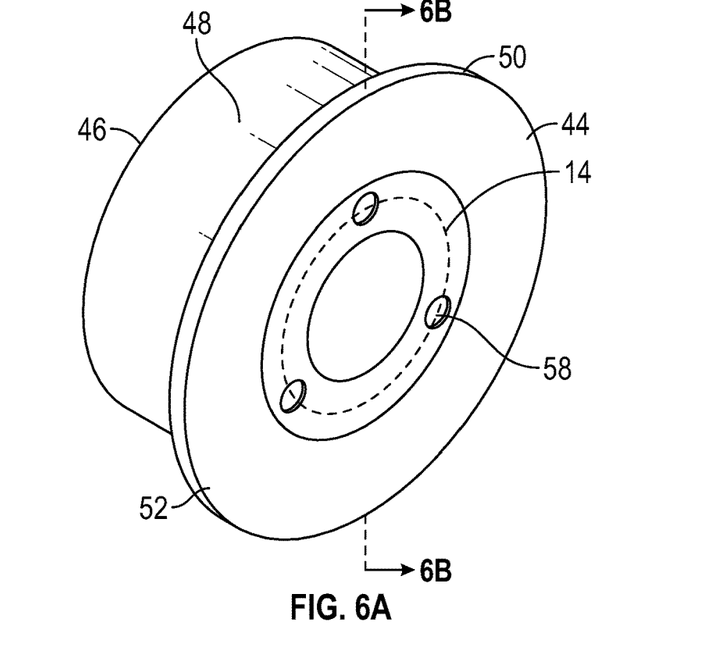
FIGS. 6A and 6B are, respectively, bottom isometric and side partially cross-sectional views of a flanged tire portion of the flanged polymeric cam follower of FIGS. 1-4.
Figure 6B:
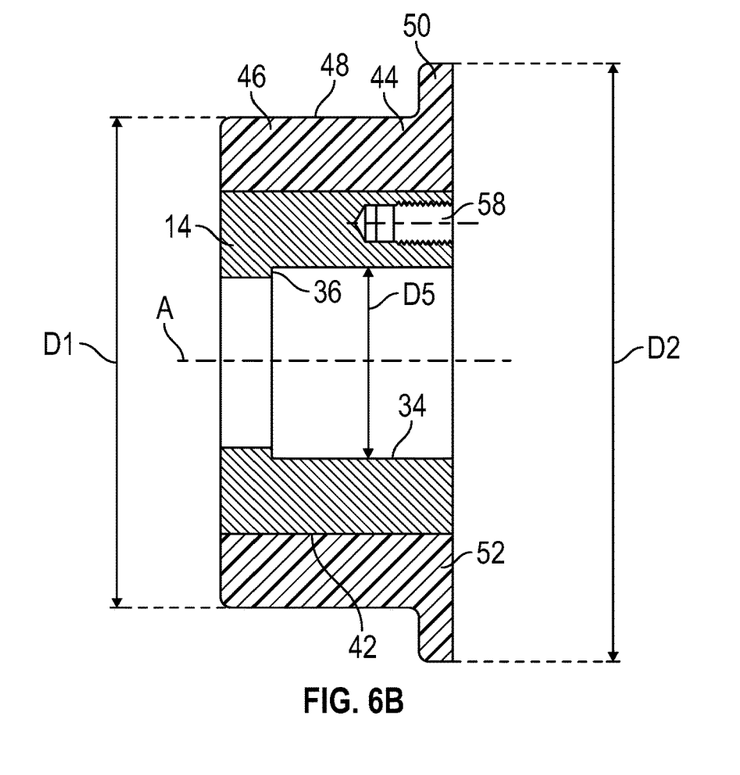

Referring now to FIGS. 6A and 6B in addition to FIGS. 1-4, the hub (14) defines a generally cylindrical hollow interior area (34) with the ball bearings (16, 18, 20) disposed therein, as best seen in FIG. 4. One end of the interior area (34) is provided with a shoulder (36), which abuts the ball bearing (16) so as to retain the ball bearings (16, 18, 20) within the interior area (34), as more fully described below. During assembly, the ball bearings (16, 18, 20) are inserted into the interior area (34) from the right (with respect to the orientation shown in FIG. 4) and moved toward the left until the ball bearing (16) abuts the shoulder (36). While three ball bearings (16, 18, 20) are shown, a smaller or larger number of ball bearings may be employed instead. Moreover, other types of bearings, such as roller bearings, may be used in addition to, or instead of, ball bearings.

The ball bearings (16, 18, 20) are disposed over the first axial end (26) of the shaft (12) such that the hub (14) is rotatable with respect to the shaft (12) via the ball bearings (16, 18, 20). The ball bearings (16, 18, 20), and consequently the hub (14), may be axially retained on the shaft (12) by provision of a shoulder (38) on the shaft (12) which abuts ball bearing (20), and by another shoulder, flange, retaining clip or the like (40) (best seen in FIG. 4) abutting ball bearing (16). The hub (14) is preferably formed from a metal material to provide robust structural support. In some situations, the hub (14) is formed from stainless steel, which is particularly well-suited for use in corrosive environments.

The hub (14) further defines an outer peripheral surface (42) which may, in some embodiments, be generally cylindrical. Such is not strictly necessary however, and if desired, the outer peripheral surface (42) may have other shapes, such as being polygonal, frustoconical, etc.

Still referring to FIGS. 1-4, 6A and 6B, a flanged tire (44) is affixed to the outer peripheral surface (42) of the hub (14), such that the flanged tire (44) is rotatable with the hub (14) with respect to the shaft (12). The flanged tire (44) defines a main body portion (46) with a generally cylindrical outer surface (48) with a main body diameter (D1) and a flange portion (50) extending radially outwardly from the generally cylindrical outer surface (48) of the main body portion (46). The flange portion (50) has a flange diameter (D2) that is larger than the main body diameter (D1).

The main body portion (46) and the flange portion (50) of the flanged tire (44) are integrally formed from a polymeric material. In certain situations, it is desirable for the flanged tire (44) to formed from a polyamide material, such as a nylon. While the main body portion (46) and the flange portion (50) may be formed separately and then joined together to form an integral piece, it is preferred for the main body portion (46) and the flange portion (50) to be formed as a single, monolithic piece, for example, by injection molding or the like. Such a monolithic configuration is generally known to provide enhanced structural integrity, as compared to separately formed components subsequently being joined together.

Figure 1:
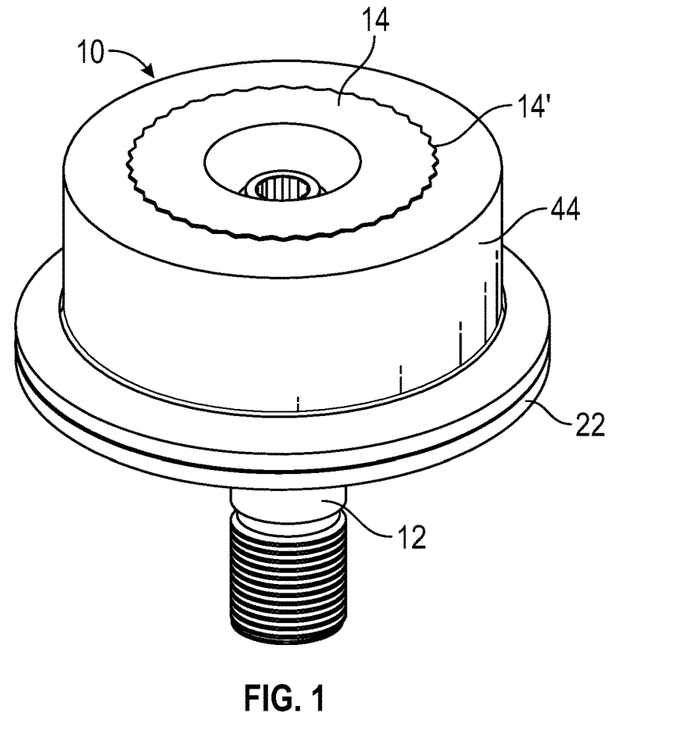
FIG. 1 is a top isometric view of a flanged polymeric cam follower in accordance with an exemplary embodiment of the present invention.
Figure 2:
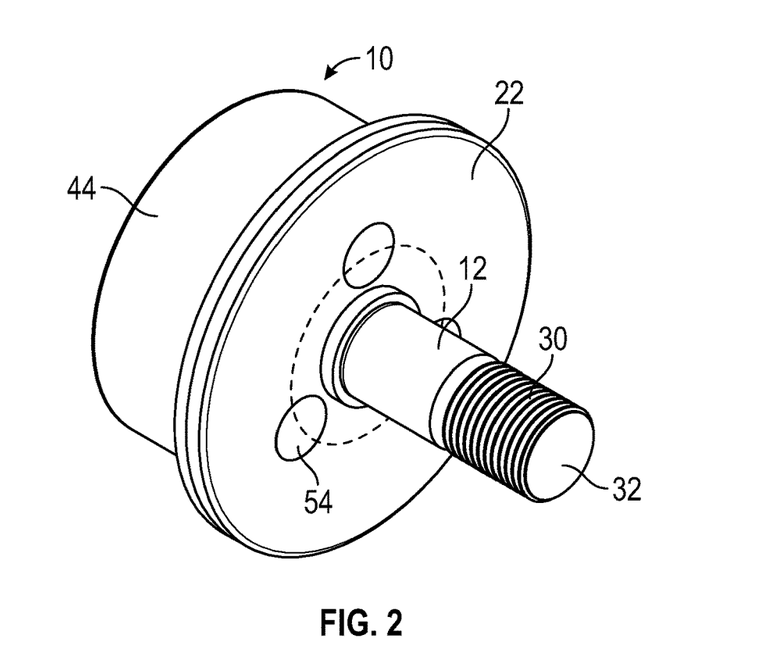
FIG. 2 is a bottom isometric view of the flanged polymeric cam follower of FIG. 1.
Figure 3:
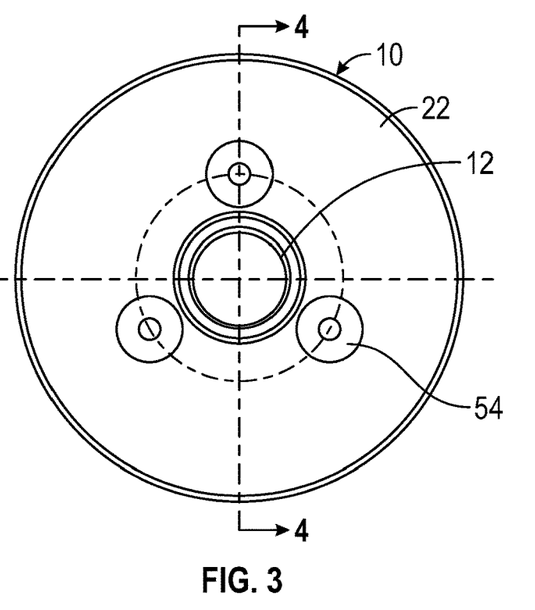
FIG. 3 a bottom plan view of the flanged polymeric cam follower of FIGS. 1 and 2.

The flanged tire (44) may be affixed to the outer peripheral surface (42) of the hub (14) by various means, such as by friction fit, by application of adhesives, by ultrasonic welding, etc. However, in a preferred embodiment, the flanged tire (44) is directly molded onto the outer peripheral surface (42) of the hub (14). In order to enhance the bond between the flanged tire (44) and the hub (14), and as best seen in FIG. 1, the outer peripheral surface (42) of the hub (14) may have protrusions, recesses or both protrusions and recesses (14') provided thereon in order to enhance attachment of the flanged tire (44) to the hub (14). As one specific example, the outer peripheral surface (42) of the hub (14) is knurled in order to enhance attachment of the flanged tire (44) to the hub (14).

As can best be seen in FIGS. 6A and 6B, the hub (14), the main body portion (46) and the flange portion (50) of the flanged tire (44) are disposed so as to define a generally planar outer surface (52) facing the second axial shaft end (32) (as seen in FIG. 4).

Figure 7A:
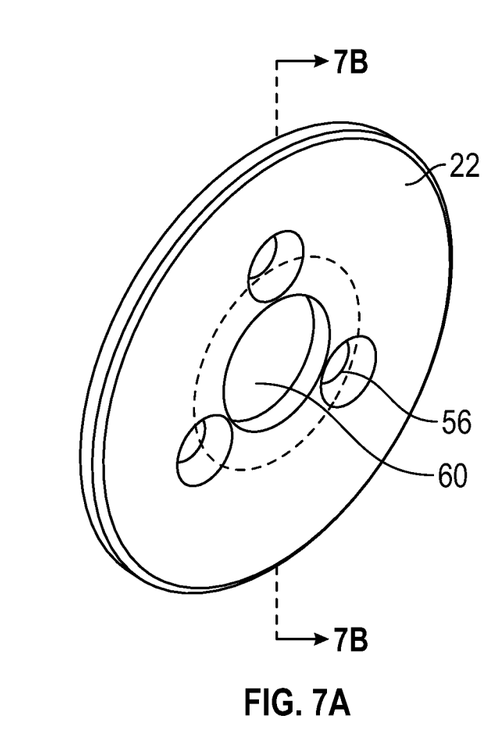
FIGS. 7A and 7B are, respectively, bottom isometric and side partially cross-sectional views of a flange support plate portion of the flanged polymeric cam follower of FIGS. 1-4.
Figure 7B:
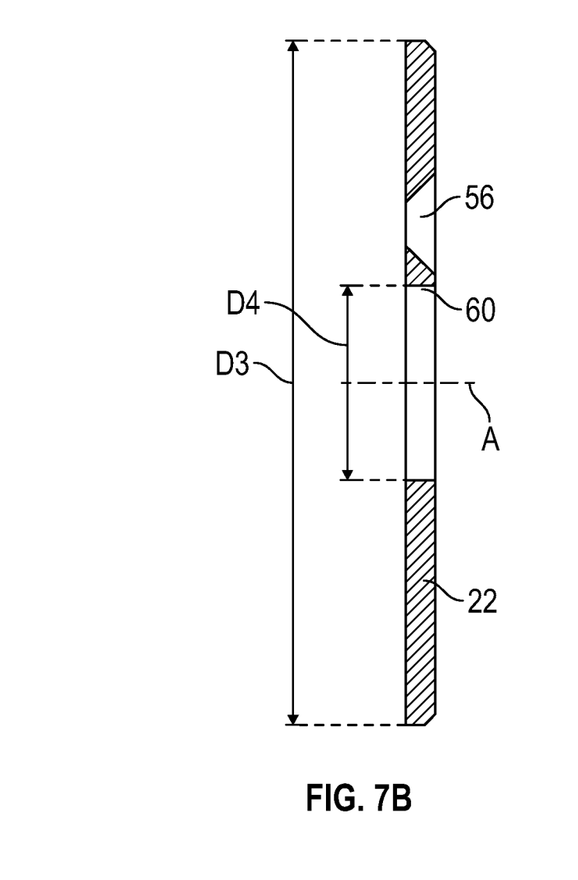

Referring now specifically to FIGS. 7A and 7B in addition to FIGS. 1-4, the flange support plate (22) abuts the generally planar outer surface (52) of the flanged tire (44) and is rigidly affixed to the hub (14), for example, by a plurality of fasteners (54). In the embodiment shown, the fasteners (54) take the form of screws passing through holes (56) in the flange support plate (22) engaging threaded openings (58) in the hub (14). As shown, the fasteners (54) and the holes (56) in the flange support plate (22) may be beveled such that the fasteners (56) are flush with the flange support plate (22) when assembled, as shown in FIG. 4. Three fasteners (54) are shown in the FIGS., though a smaller or larger number may be provided.

The flange support plate (22) is formed from a metal material, with stainless steel being preferred in some applications, particularly in corrosive environments. The flange support plate (22) has a support plate outer diameter (D3) that is generally equal to or greater than the flange diameter (D2) of the flange portion (50) of the flanged tire (44), so as to support the flange portion (50) over its entire extent, thereby providing structural support to the flange portion (50) for axial forces, i.e., forces applied to the flange portion (50) in a direction normal to the generally planar outer surface (52).

The flange support plate (22) also includes an opening (60) passing therethrough having an inner support plate diameter (D4), with the opening (60) being sized and positioned to accommodate the shaft (12), as best seen in FIG. 4. The inner support plate diameter (D4) is preferably smaller than the inner hub diameter (D5) of the interior area (34) of the hub (14) such that when the flange support plate (22) is affixed to the hub (14), the opening (60) in the flange support plate (22) defines a shoulder (62) so as to retain the ball bearings (16, 18, 20) between shoulder (62) and shoulder (36), as best seen in FIG. 4. Also as shown in FIG. 4, the combined thickness of the ball bearings (16, 18, 20) is preferably approximately equal to the distance between the shoulder (62) and the shoulder (36) so as to minimize axial play between the various components.

Provision of a metal hub (14) provides several advantages over an all polymer design, including the following: a metal hub (14) supports the polymer flanged tire (44) on the entire length thereof and evenly distributes the radial load to the ball bearings (16, 18, 20), which translates into higher load-bearing capacity; a metal hub (14) can be tapped and threaded to securely mount the flange support plate (22) thereto; a metal hub (14) can be formed from stainless steel for corrosive environments; and a metal hub (14) provides enhanced safety (i.e., in case the polymer flanged tire (44) is destroyed, moving objects will stay on the rail).

Provision of a polymer flanged tire (44), on the other hand, also provides several advantages, including the following: no lubrication is required on the rail or the bearings (bearings are lubricated for life); there is no rail wear, which results in substantial savings on replacing worn-out rails (e.g., on palletizers); with a polymer flanged tire (44), there is no grease and metal particulate contamination; a polymer flanged tire (44) reduces noise by up to 10 dB, as compared to metal cam followers; and a polymer flanged tire (44) presents a polymer contact surface with the metal rail, which is an excellent electrical insulator.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A cam follower comprising:
    a shaft extending from a first axial shaft end to a second axial shaft end;
    a hub defining an interior area with at least one bearing disposed therein, the at least one bearing being disposed over the first axial shaft end such that said hub is rotatable with respect to said shaft via the at least one bearing, said hub further defining an outer peripheral surface;
    a flanged tire affixed to the outer peripheral surface of said hub and rotatable with said hub with respect to said shaft, said flanged tire having a main body portion with a generally cylindrical outer surface with a main body diameter and having a flange portion extending radially outwardly from the generally cylindrical outer surface of the main body portion, the flange portion having a flange diameter that is larger than the main body diameter;
    wherein the main body portion and the flange portion are integrally formed from a polymeric material;
    wherein said hub, the main body portion and the flange portion are disposed so as to define a generally planar outer surface facing the second axial shaft end; and
    a flange support plate having a support plate outer diameter that is generally equal to or greater than the flange diameter, said flange support plate abutting the generally planar outer surface and being rigidly affixed to said hub, said flange support plate being formed from a metal material, thereby providing structural support to the flange portion for forces applied to the flange portion in a direction normal to the generally planar outer surface.

2. The cam follower of claim 1 wherein the outer peripheral surface of said hub is generally cylindrical.

3. The cam follower of claim 2 wherein the outer peripheral surface of said hub has protrusions, recesses or both protrusions and recesses thereon in order to enhance attachment of said flanged tire to said hub.

4. The cam follower of claim 3 wherein the outer peripheral surface of said hub is knurled in order to enhance attachment of said flanged tire to said hub.

5. The cam follower of claim 1 wherein said hub is formed from a metal material.

6. The cam follower of claim 5 wherein said hub is formed from stainless steel.

7. The cam follower of claim 6 wherein said flange support plate is formed from stainless steel.

8. The cam follower of claim 1 wherein the at least one bearing comprises at least two bearings.

9. The cam follower of claim 8 wherein the at least one bearing comprises at least three bearings.

10. The cam follower of claim 1 wherein the second axial shaft end comprises a fastener adapted to attach said shaft to another component.

11. The cam follower of claim 10 wherein the fastener of the second axial shaft end comprises a threaded portion.

12. The cam follower of claim 1 wherein the main body portion and the flange portion of said flanged tire are monolithic.

13. The cam follower of claim 12 wherein the main body portion and the flange portion of said flanged tire are formed from a polyamide material.

14. The cam follower of claim 1 further comprising a plurality of fasteners rigidly affixing said flange support plate to said hub.

15. The cam follower of claim 14 wherein the fasteners are screws passing through holes in said flange support plate and engaging threaded openings in said hub.

16. The cam follower of claim 1 wherein said flange support plate includes an opening passing therethrough having an inner support plate diameter, wherein the opening passing through said flange support plate is sized and positioned to accommodate said shaft.

17. The cam follower of claim 16 wherein the interior area of said hub has an inner hub diameter and wherein the inner support plate diameter is smaller than the inner hub diameter, whereby the at least one bearing is retained in the interior area of the hub by said flange support plate.

18. A cam follower comprising:
    a shaft extending from a first axial shaft end to a second axial shaft end, the second axial shaft end comprising a fastener adapted to attach said shaft to another component;
    a hub defining an interior area with at least one bearing disposed therein, the at least one bearing being disposed over the first axial shaft end such that said hub is rotatable with respect to said shaft via the at least one bearing, said hub being formed from a metal material and further defining a generally cylindrical outer peripheral surface having protrusions, recesses or both protrusions and recesses formed thereon;
    a flanged tire affixed to the outer peripheral surface of said hub and rotatable with said hub with respect to said shaft, said flanged tire having a main body portion with a generally cylindrical outer surface with a main body diameter and having a flange portion extending radially outwardly from the generally cylindrical outer surface of the main body portion, the flange portion having a flange diameter that is larger than the main body diameter;
    wherein the main body portion and the flange portion are integrally formed from a monolithic piece of polymeric material;
    wherein said hub, the main body portion and the flange portion are disposed so as to define a generally planar outer surface facing the second axial shaft end; and
    a flange support plate having a support plate outer diameter that is generally equal to or greater than the flange diameter, said flange support plate abutting the generally planar outer surface and being rigidly affixed to said hub by a plurality of threaded fasteners passing through holes in said flange support plate and engaging threaded openings in said hub, said flange support plate including an opening passing therethrough having an inner support plate diameter, wherein the opening passing through said flange support plate is sized and positioned to accommodate said shaft, said flange support plate being formed from a metal material, thereby providing structural support to the flange portion for forces applied to the flange portion in a direction normal to the generally planar outer surface.

19. The cam follower of claim 18 wherein the outer peripheral surface of said hub is knurled in order to enhance attachment of said flanged tire to said hub.

20. The cam follower of claim 18 wherein said hub is formed from stainless steel.

21. The cam follower of claim 20 wherein said flange support plate is formed from stainless steel.

22. The cam follower of claim 18 wherein the at least one bearing comprises at least two bearings.

23. The cam follower of claim 22 wherein the at least one bearing comprises at least three bearings.

24. The cam follower of claim 18 wherein the fastener of the second axial shaft end comprises a threaded portion.

25. The cam follower of claim 18 wherein the main body portion and the flange portion of said flanged tire are formed from a polyamide material.

26. The cam follower of claim 18 wherein the interior area of said hub has an inner hub diameter and wherein the inner support plate diameter is smaller than the inner hub diameter, whereby the at least one bearing is retained in the interior area of the hub by said flange support plate.

\* \* \* \* \*